(12) United States Patent
Brumley et al.

(10) Patent No.: US 9,135,405 B2
(45) Date of Patent: Sep. 15, 2015

(54) AUTOMATED EXPLOIT GENERATION

(75) Inventors: David Brumley, Pittsburgh, PA (US);
Sang Kil Cha, Pittsburgh, PA (US);
Thanassis Avgerinos, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 534 days.

(21) Appl. No.: 13/481,248

(22) Filed: May 25, 2012

(65) Prior Publication Data

US 2012/0317647 A1    Dec. 13, 2012

Related U.S. Application Data

(60) Provisional application No. 61/519,656, filed on May 26, 2011, provisional application No. 61/519,668, filed on May 26, 2011.

(51) Int. Cl.
| | | |
|---|---|---|
| *G06F 11/00* | (2006.01) | |
| *G06F 9/44* | (2006.01) | |
| *G06F 21/00* | (2013.01) | |
| *G06F 21/57* | (2013.01) | |

(52) U.S. Cl.
CPC .............. *G06F 21/00* (2013.01); *G06F 21/577* (2013.01)

(58) Field of Classification Search
CPC ..... G06F 21/577; G06F 21/125; G06F 21/14; G06F 21/52; G06F 21/563; G06F 21/566; G06F 11/3612; G06F 2221/033; G06F 8/443

USPC ............. 726/7, 22, 23, 25; 717/124, 126, 130
See application file for complete search history.

(56) References Cited

U.S. PATENT DOCUMENTS

| | | | |
|---|---|---|---|
| 6,817,014 B2 * | 11/2004 | Hundt et al. ................... | 717/159 |
| 7,237,265 B2 * | 6/2007 | Reshef et al. .................... | 726/25 |
| 7,284,274 B1 * | 10/2007 | Walls et al. ...................... | 726/25 |
| 8,316,448 B2 * | 11/2012 | Peinado et al. .................. | 726/25 |
| 8,966,453 B1 * | 2/2015 | Zamfir et al. .................. | 717/130 |
| 2007/0192863 A1 * | 8/2007 | Kapoor et al. ................... | 726/23 |
| 2008/0209567 A1 * | 8/2008 | Lockhart et al. ................ | 726/25 |
| 2009/0216626 A1 * | 8/2009 | Lund ................................ | 705/11 |
| 2010/0058475 A1 * | 3/2010 | Thummalapenta et al. .... | 726/25 |
| 2012/0260344 A1 * | 10/2012 | Maor et al. ...................... | 726/25 |

OTHER PUBLICATIONS

Brumley et al. Automatic Patch-Based Exploit Generation is Possible: Technique and Implications. 2008. IEEE. pp. 143-157.*
Gu, Guofei, "Computer Security Conference Ranking and Statistic", [Online]. Retrieved from the Internet: <URL: http://faculty.cs.tamu.edu/guofei/sec_conf_stat.htm>, (Accessed: Jan. 7, 2015), 4 pgs.

(Continued)

*Primary Examiner* — Dede Zecher
*Assistant Examiner* — Abdullah Almamun
(74) *Attorney, Agent, or Firm* — Schwegman Lundberg & Woessner, P.A.

(57) ABSTRACT

A system and method for automatically generating exploits, such as exploits for target code, is described. In some implementations, the system received binary code and/or source code of a software applications, finds one or more exploitable bugs within the software application, and automatically generates exploits for the exploitable bugs.

23 Claims, 7 Drawing Sheets

(56) References Cited

OTHER PUBLICATIONS

Thanassis, Avgerinos, et al., "AEG: Automatic Exploit Generation", Network and Distributed Systems Symposium (NDSS), (2011), 18 pgs.

Wallach, Dan, "Federating the "big four" computer security conferences", [Online]. Retrieved from the Internet: <URL: https://freedom-to-tinker.com/blog/dwallach/federating-big-four-computer-security-conferences/>, (Apr. 6, 2011), 4 pgs.

Zhou, Jianying, "Top Crypto and Security Conferences Ranking (2014)", [Online]. Retrieved from the Internet: <URL: http://icsd.i2r.astar.edu.sg/staff/jianying/conferenceranking.html>, (Accessed: Jan. 7, 2015), 3 pgs.

* cited by examiner

AUTOMATED EXPLOIT GENERATION

CROSS REFERENCE TO RELATED APPLICATIONS

This application claims priority to U.S. Provisional Patent Application No. 61/519,656, filed on May 26, 2011, entitled SYSTEMS AND METHODS FOR AUTOMATIC EXPLOIT GENERATION, and U.S. Provisional Patent Application No. 61/519,668, filed on May 26, 2011, entitled PREFIX SYMBOLIC EXECUTION FOR AUTOMATIC EXPLOIT GENERATION, which are hereby incorporated by reference in their entirety.

STATEMENT REGARDING FEDERALLY SPONSORED RESEARCH AND DEVELOPMENT

This invention was made, in part with government support under Grant Number CNS-0953751 awarded by the National Science Foundation, and Grant Number N10AP20021 awarded by the Department of Interior and DARPA. The United States government may have certain rights in this invention.

TECHNICAL FIELD

The subject matter disclosed herein generally relates to computer security. Specifically, the present disclosure addresses systems and methods to identify vulnerabilities in software applications and automatically generate exploits.

BACKGROUND

An exploit, such as a control flow exploit, allows an attacker to execute arbitrary code on a computer. Typically, an attacker will manually review the code of a software program, identify a vulnerability, or hug, and attempt to exploit that vulnerability. If the vulnerability is exploitable, the attacker will seize control of the software, and any computing device running the software, until the exploit is discovered and removed, and the vulnerability is fixed.

Manual, or somewhat automated, techniques can be suitable for attackers when seeking vulnerabilities, as they only need to find one exploitable bug to be successful in compromising a computing system. However, computer security professionals cannot rely on a manual review of software alone, as they would ideally like to identify and fix any and all exploitable bugs in software before certifying that software as secure. Otherwise, that software could be compromised.

BRIEF DESCRIPTION OF THE DRAWINGS

Some embodiments are illustrated by way of example and not limitation in the figures of the accompanying drawings.

DETAILED DESCRIPTION

Example methods and systems are directed to the automatic generation of exploits for vulnerabilities in software applications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A system and method for automatically detecting of vulnerabilities in computer software is described. In some implementations, the system searches for and locates vulnerabilities, or bugs, in a software program, determines which of the found vulnerabilities can be exploited, and automatically generates exploits for the exploitable vulnerabilities.

Accordingly, the system may access target software, such as via the source code and/or executable code of the software, finds bugs in the software, determines which of the bugs are possibly exploitable, and automatically generates an exploit (e.g., a root shell), for the exploitable bugs in the software.

Thus, in some example implementations, the system may provide computer security professionals with tools and techniques to quickly and efficiently identify and fix bugs and other vulnerabilities within software. The system, by identifying which bugs are exploitable, may enable security professionals to prioritize bug fixes within software, and by generating exploits without real-world attacks, may provide inputs into signature generation algorithms that recognize subsequent or variant exploits, among other benefits.

Suitable Computing Environment

As described herein, in some example implementations, the system may provide fully automated end-to-end exploit generation for vulnerabilities within computing software. In some example embodiments, the system includes components and techniques that analyze source code as well as binary code when automatically generating exploits. Therefore, in an example embodiment, the system may provide a diligent, robust framework for a software program when generating exploits. In some example embodiments, the system includes components and techniques that analyze binary code without also analyzing the source code. Therefore, in some example embodiments, the system may provide a fast, robust, symbolic execution framework for real code when generating exploits.

Figure 1:
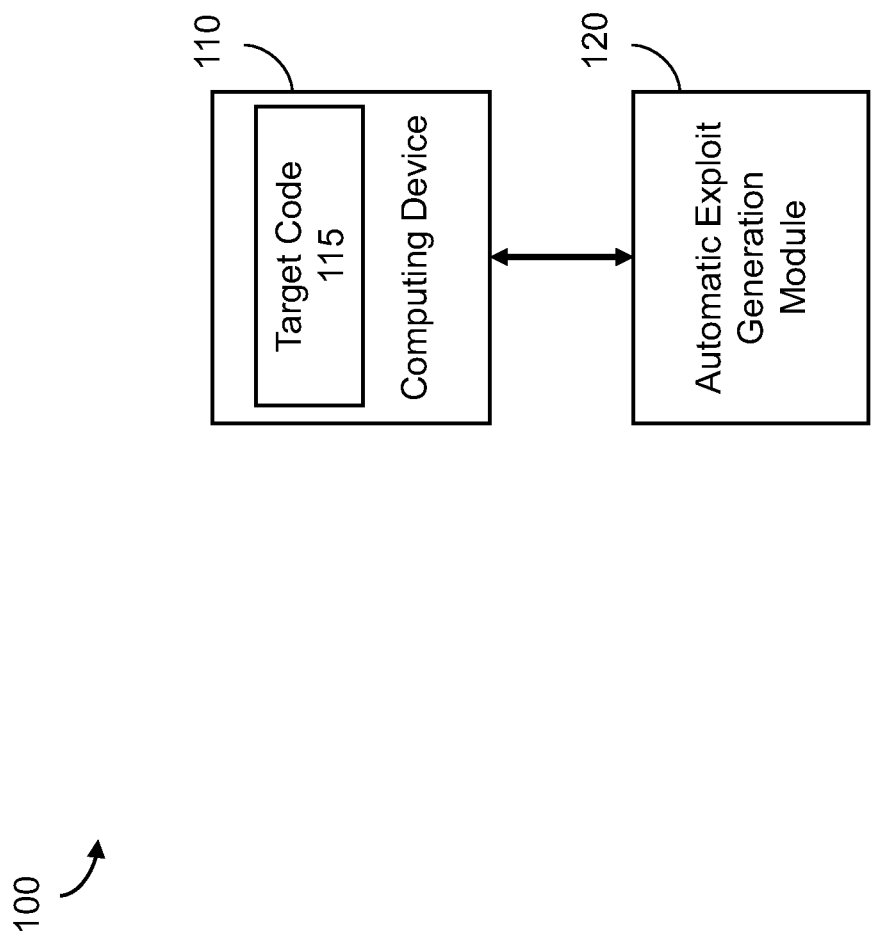
FIG. 1 is a block diagram illustrating a suitable computing environment in which to implement automatic exploit generation, according to an example embodiment.

FIG. 1 is a block diagram 100 illustrating a suitable computing environment in which to implement automatic exploit generation, according to an example embodiment. The computing environment 100 includes a computing device 110, which contains software 115 to be analyzed, and an automatic exploit generation (AEG) module 120, which is configured and/or programmed to identify exploitable bugs within the software 115 and automatically generate exploits for the identified bugs. In an example embodiment, the automatic exploit generation module 120 may access the code (e.g., the source code, the binary code, and/or both) either locally or over a network, and performs various actions to identify bugs within the code, determine whether the bugs are exploitable, and automatically generate exploits for the exploitable bugs. Further example details regarding the automatic generation of exploits are described herein.

FIG. 1 and the discussion herein provide a brief, general description of a suitable computing environment in which automatic exploit generation can be implemented. Although not required, aspects of the system are described in the general context of computer-executable instructions, such as routines executed by a general-purpose computer, e.g., a server computer, personal computer, mobile device, and so on. Those skilled in the relevant art will appreciate that the system can be practiced with other communications, data processing, or computer system configurations, including: Internet appliances, hand-held devices (including personal digital assistants (PDAs)), all manner of cellular or mobile phones, multiprocessor systems, microprocessor-based or programmable consumer electronics, set-top boxes, network PCs, minicomputers, mainframe computers, and the like. Indeed, the terms "computer," "host," and "host computer," are generally used interchangeably herein, and refer to any of the above devices and systems, as well as any data processor.

Aspects of the example system can be embodied in a special purpose computing device or data processor that is specifically programmed, configured, or constructed to perform one or more of the computer-executable instructions explained in detail herein. Aspects of the example embodiments of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the example embodiments of the system may be stored or distributed on computer-readable media (e.g. tangible computer-readable media, computer-readable storage media, tangible computer-readable storage media, and so on), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

The computing environment 100 and the devices 110 and/or 120 may each be implemented in a computer system, in whole or in part, as described below with respect to FIG. 7. Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 7. As used herein, a "database" includes a data storage resource and may store data structured as a text file, a table, a spreadsheet, a relational database (e.g., an object-relational database), a triple store, a hierarchical data store, or any suitable combination thereof. Moreover, any two or more of the machines illustrated in FIG. 1 may be combined into a single machine, and the functions described herein for any single machine may be subdivided among multiple machines.

Automatically Generating Exploits

As discussed herein, in some example embodiments, the system may find bugs in software applications, determine whether a bug is exploitable, and, if so, produce a working exploit, which may be directly fed into the vulnerable application.

Figure 2:
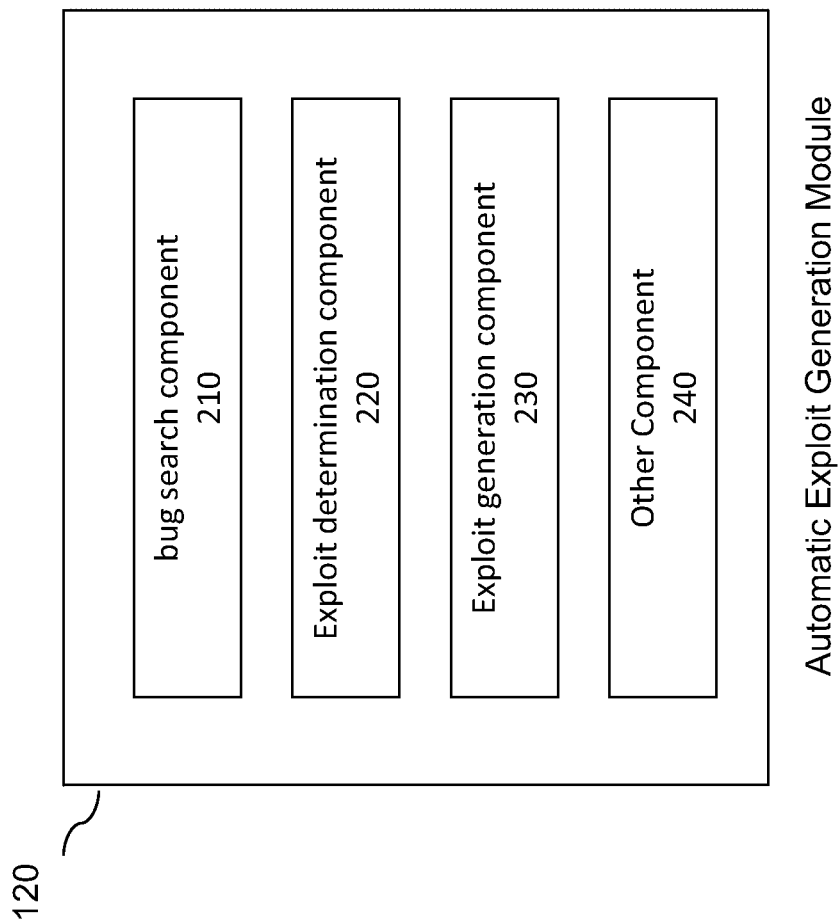
FIG. 2 is a block diagram illustrating components of an automated exploit generation module, according to an example embodiment.

FIG. 2 is a block diagram 200 illustrating components of an automated exploit generation module, according to an example embodiment. The automated exploit generation module 120 includes a bug search component 210 configured and/or programmed to search for and find bugs within a software application, such as within the source code or binary code of the software application. For example, the bug search component 210 performs preconditioned symbolic execution techniques, or other path prioritization techniques, when searching for bugs within the software application.

The automated exploit generation module 120 is shown to include an exploit determination component 220 configured and/or programmed to identify and/or determine which found bugs are or might be exploitable within a software application. For example, the exploit determination component 220 may utilize heuristics or other techniques to identify paths within code that lead to exploitable bugs, among things.

The automated exploit generation module 120 is also shown to include an exploit generation component 230 configured and/or programmed to automatically generate exploits for bugs determined to be exploitable by the exploit determination component 220. For example, the exploit generation component 230 may utilize memory information, run-time information, constraint information, and so on, when automatically generating an exploit for a bug.

Figure 3:
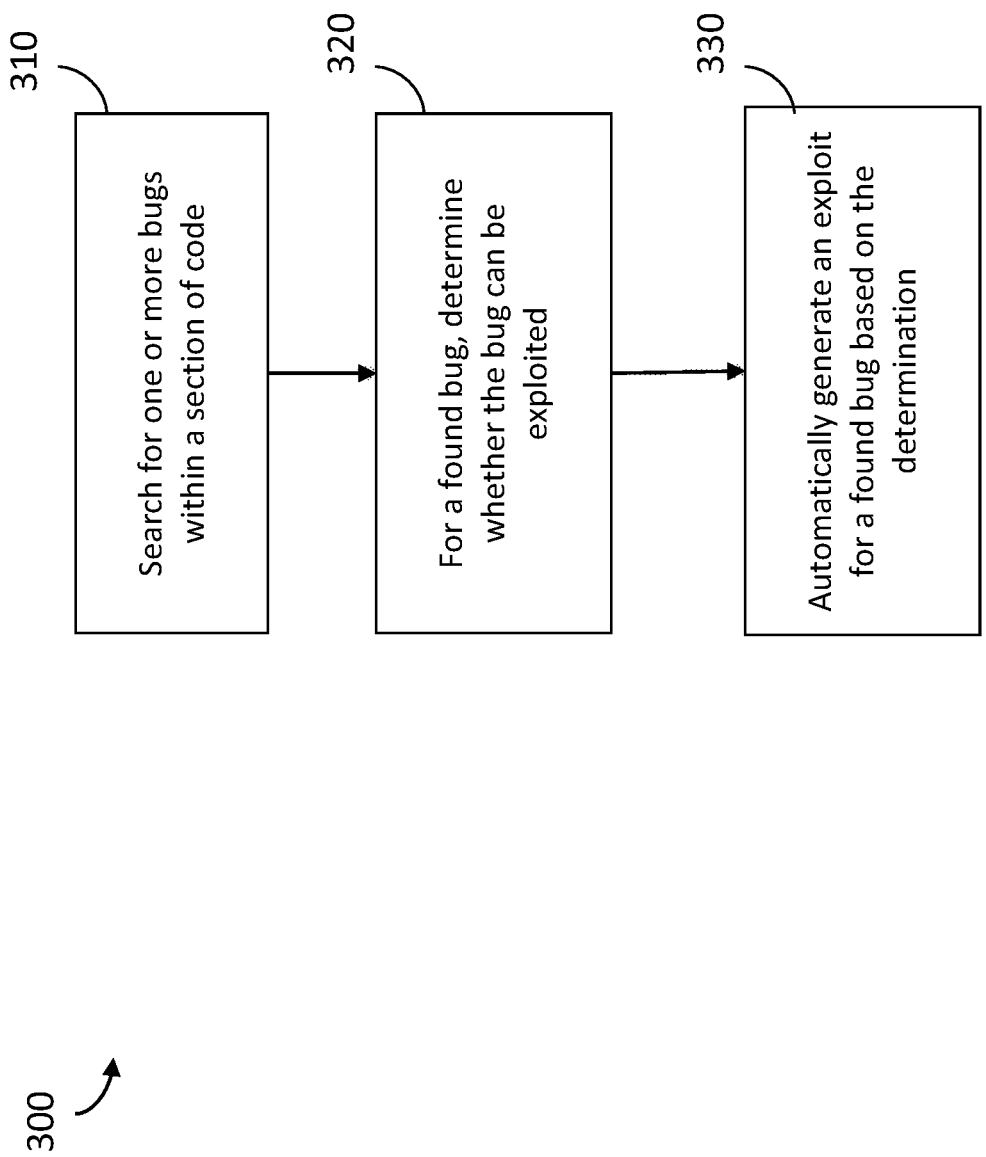
FIG. 3 is a flow diagram illustrating a method for automatically generating an exploit, according to an example embodiment.

Of course, the automated exploit generation module 120 may include other components 240, such as log components, reporting components, memory components, and so on. Further details regarding the components of the automated exploit generation module 120 are described herein. However, generally, they act to perform a method 300 for automatically generating an exploit, as shown by way of example in FIG. 3.

In step 310, the system searches for one or more bugs within a software application. For example, the system, via the bug search component 210, uses preconditioned symbol execution techniques to search for a path or paths within the software application that may include exploitable bugs.

In step 320, the system determines whether any found bugs can be exploitable. For example, the system, via the exploit determination component 220, identifies path of bugs that lead to exploitable bugs and determines such bugs are exploitable (e.g., determines a return address or structured exception handler can be overwritten).

In step 330, the system automatically generates an exploit for the found exploitable bugs. For example, the system, via the exploit generation component 230, automatically generates an exploit for an exploitable bug based on constraints and other information associated with the bug.

Thus, the system, either by analyzing the source code and the binary code of a software application, or just the binary code, may identify exploitable bugs and automatically generate exploits for the identified bugs within a software application, among other things. Details regarding the different techniques in which to find bugs, determine whether they are exploitable, and/or generate exploits will now be discussed.
Analyzing Source Code in order to Automatically Generate Exploits As discussed herein, in some implementations, the system finds bugs in the source code and binary code of software applications, determines whether a bug is exploitable, and, if so, produces a working exploit string, which may be directly fed into the vulnerable application. Some examples of a working exploit string may include exploit strings that cause control flow hijack, control flow hijack to get a shell, perform a denial of service, leak private information, and so on.

Figure 4:
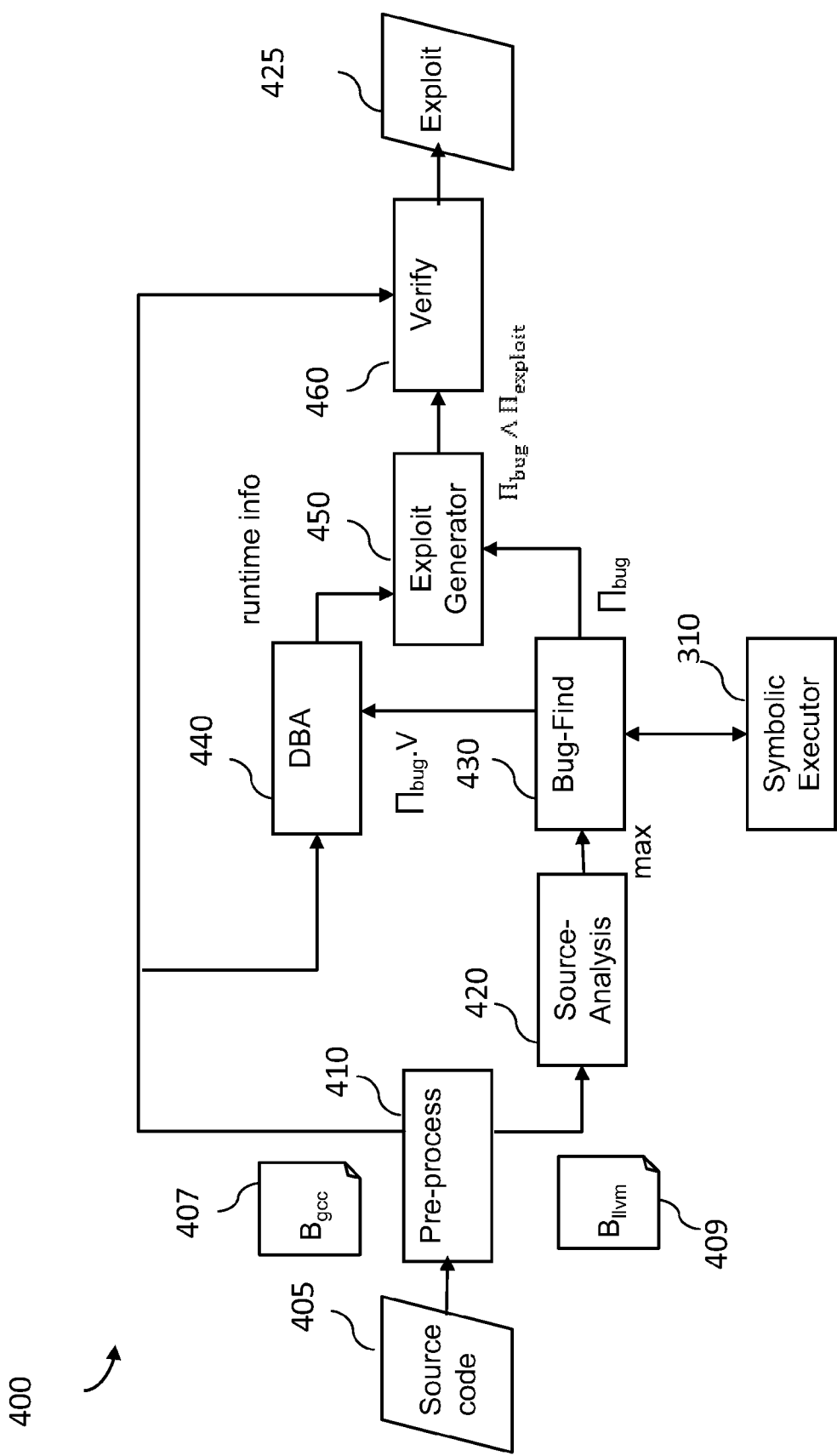
FIG. 4 is a block diagram illustrating components of an automatic exploit generation module that generates exploits for analyzed source code, according to an example embodiment.

FIG. 4 is a block diagram 400 illustrating components of an automatic exploit generation module that generates exploits for analyzed source code, in accordance with an example embodiment. The system may include various components, including a pre-processing component (Pre-Process) 410, a source analysis component (Src-Analysis) 420, a find component (Bug-Find) 430, a binary analysis component (DBA) 440, an exploit generation component (Exploit-Gen) 450, and/or a verification component (Verify) 460.

In some embodiments, a user provides a source program 405 to the pre-processing component 410, which compiles down the input into 1) a binary $B_{gcc}$ 407, for which the system attempts to generate a working exploit and 2) a representation of the source code, such as LLVM bytecode, in a file $B_{llvm}$ 409, to be utilized by the find component 430 when searching for bugs.

The source analysis component 420 analyzes the source code to generate the maximum size of symbolic data max that should be provided to the program. In some cases, it determines max by searching for the largest statically allocated buffers of the target program. In some cases, the system uses the heuristic that max should be at least 10% larger than the largest buffer size.

The find component 430 takes in LLVM bytecode $B_{llvm}$ 409 and a safety property φ, and outputs a tuple <$\Pi_{bug}$,V> for each detected vulnerability. The $\Pi_{bug}$ contains the path predicate, which is the path constraints up to the violation of the safety property φ. The v contains source-level information about the detected vulnerability, such as the name of the object being overwritten, and the vulnerable function. To generate the path constraints, the system uses a symbolic executor. The symbolic executor reports a bug to the system whenever there is a violation of the φ property. The system may utilize several different bug-finding techniques to detect exploitable bugs, some of which are now discussed.

BUG-FIND takes as input the target program in LLVM bytecode form, checks for bugs, and for each bug found attempts the remaining exploit generation steps until it succeeds. BUG-FIND finds bugs with symbolic program execution, which explores the program state space one path at a time. However, there are potentially an infinite number of paths to potentially explore. The system addresses this problem with two algorithms. First, the system utilizes preconditioned symbolic execution that constrains the paths considered to those that would most likely include exploitable bugs. Second, the system utilizes prioritization heuristics for choosing which paths to explore first with preconditioned symbolic execution.
Symbolic Execution for Bug Finding At a high level, symbolic execution is conceptually similar to normal concrete execution except that we provide a fresh symbolic variable instead of providing a concrete value for inputs. As the program executes, each step of symbolic execution builds up an expression by substituting symbolic inputs for terms of the program. At program branches, the interpreter conceptually "forks off" two interpreters, adding the true branch guard to the conditions for the true branch interpreter, and similarly for the false branch. In some embodiments, actual forking may not happen, such as when the symbolic executor decides to take a specific path. The conditions imposed as the interpreter executes are called the path predicate to execute the given path. After forking, the interpreter may check if the path predicate is satisfiable by querying a decision procedure, before performing further exploration. If not, the path is not realizable by any input, so the interpreter may exit. If the path predicate can be satisfied, the interpreter continues executing and exploring the program state space.

Symbolic execution is used to find bugs by adding safety checks using φ. For example, whenever we access a buffer using a pointer, the interpreter needs to ensure the pointer is within the bounds of the buffer. The bounds-check returns either true, meaning the safety property holds, or false, meaning there is a violation, thus a bug. Whenever a safety violation is detected, symbolic execution stops and the current buggy path predicate ($\Pi_{bug}$) is reported.
Preconditioned Symbolic Execution A challenge with symbolic execution (and other verification techniques) is managing the state space explosion problem. Since symbolic execution may need to reason about each new path at each branch, the state space to explore may be huge or infinite.

The system may utilize preconditioned symbolic execution to target symbolic execution towards a certain subset of the input state space. The state space subset is determined by the precondition predicate ($\Pi_{prec}$); inputs that do not satisfy $\Pi_{prec}$ will not be explored. The system may constrain the state space to be explored by specifying exploitability conditions as a precondition, e.g., all symbolic inputs should have the maximum size to trigger buffer overflow bugs. The main benefit from preconditioned symbolic execution is simple: by limiting the size of the input state space before symbolic execution begins, the system may prune program paths and therefore explore the target program more efficiently.

Note that preconditions cannot be selected at random. If a precondition is too specific, the system may detect no exploits (since exploitability will probably not imply the precondition); if it is too general, the system may explore almost the entire state space. Thus, preconditions have to describe common characteristics among exploits (to capture as many as possible) and at the same time it should eliminate a significant portion of non-exploitable inputs.

Preconditioned symbolic execution may enforce the precondition by adding the precondition constraints to the path predicate during initialization. The precondition, along with path constraints, may be checked before deciding to explore a particular path or branch. If the precondition is false, then the branch or path is not followed.

The system has developed at least three different preconditions for efficient exploit generation, although any safety policy that can be expressed in logic can be used as a precondition:

"None"—where there is no precondition and the state space is explored as normal. Preconditioned symbolic execution is equivalent to standard symbolic execution. The input precondition is true (the entire state space).

"Known Length"—where the precondition is that inputs are of known length, such as a maximum or minimum. In one embodiment, the system uses static analysis to automatically determine this precondition. For example, if the input data is of type string, the system adds the precondition that each byte of input up to the maximum input length is not NULL, i.e., (strlen(input)=len) or equivalently in logic $$(input[0] \neq 0) \wedge (input[1] \neq 0) \wedge \ldots \wedge (input[len-1] \neq 0)$$
$$\wedge (input[len]=0.$$

"Specified Substring"—where the user specifies a known substring of inputs to consider, such as a known prefix or suffix. For example, one may specify prefix of "GET" to consider only strings that start with the letters "G", "E", and "T".

"Concolic Execution"—where the precondition is specified by a single program path as realized by an example input. For example, we may already have an input that crashes the program, and we use it as a precondition to determine if the executed path is exploitable. The dual of specifying no precondition is specifying the precondition that all input bytes have a specific value. Specifying all input bytes have a specific value is equivalent to concolic execution. Mathematically, the system specifies $\forall_i: \wedge (input[i]=concrete\_input[i])$. Note that, in this case, the system may behave as a concolic executor, where the concrete constraints describe the initial seed. Concolic execution can be very useful in practice. For instance, in some embodiments, the system may take a known proof-of-concept crash (PoC—an input that crashes the program), and use it as a seed to see if an exploit can be generated.

Path Prioritization Search Heuristics

Preconditioned symbolic execution limits the search space. However, within the search space, there is still the question of path prioritization: which paths should be explored first. The system addresses this problem with path-ranking heuristics. All pending paths are inserted into a priority queue based on their ranking, and the next path to explore is drawn out of the priority queue. In this section, we present two path prioritization heuristics developed by the system: buggy-path-first and loop exhaustion.

"Buggy-Path-First"—Exploitable bugs are often preceded by small but unexploitable mistakes. For example, a program may first has an off-by-one error in the amount of memory allocated for a strcpy. While the off-by-one error could not directly be exploited, it demonstrated that the programmer did not have a good grasp of buffer bounds. Eventually, the length misunderstanding was used in another statement further down the path that was exploitable. The observation that one bug on a path means subsequent statements are also likely to be buggy (and hopefully exploitable) informs the buggy-path-first heuristic. The buggy-path-first heuristic prioritizes buggy paths higher and continues exploration.

"Loop Exhaustion"—Loops whose exit condition depends on symbolic input may spawn a tremendous amount of interpreters—even when using preconditioned symbolic execution techniques such as specifying a maximum length. Most symbolic execution approaches mitigate this program by deprioritizing subsequent loop executions or only considering loops a small finite number of times, e.g., up to 3 iterations. While traditional loop-handling strategies are excellent when the main goal is maximizing code coverage, they often miss exploitable states. For example, the perennial exploitable bug is a strcpy buffer overflow, where the strcpy is essentially a while loop that executes as long as the source buffer is not NULL. Typical buffer sizes are quite large, e.g., 512 bytes, which means we must execute the loops at least that many times to create an exploit. Traditional approaches that limit loops simply miss these bugs. Therefore, the system may, in some cases, utilize a loop exhaustion search strategy. The loop-exhaustion strategy gives higher priority to an interpreter exploring the maximum number of loop iterations, hoping that computations involving more iterations are more promising to produce bugs like buffer overflows. Thus, whenever execution hits a symbolic loop, the system attempts to exhaust the loop—execute it as many times as possible. Exhausting a symbolic loop has two immediate side effects: 1) on each loop iteration a new interpreter is spawned, effectively causing an explosion in the state space, and 2) execution might get "stuck" in a deep loop. To avoid getting stuck, the system imposes two additional heuristics during loop exhaustion: 1) preconditioned symbolic execution along with pruning to reduce the number of interpreters or 2) giving higher priority to only one interpreter that tries to fully exhaust the loop, while all other interpreters exploring the same loop have the lowest possible priority.

In some implementations, an input substring, such as a manually created input prefix of bytes, may be utilized by the system as the precondition or to prioritize paths. For example, an HTTP request is typically of the form:

<method> <url> http/1.0 where <method> is the string literal GET, POST, or HEAD.

The user can specify an input prefix, such as GET, to preconditioned symbolic execution. During symbolic execution only those program paths that deal with input satisfying the precondition will be explored. Thus, the system applies a known prefix precondition constraint as a prefix on input bytes, e.g., an HTTP GET request always starts with "GET", or that a specific header field needs to be within a certain range of values, e.g., the protocol field in the IP header. The system may use a prefix precondition to target a search for vulnerabilities towards inputs that start with that specific prefix. For example, suppose that we wish to explore only PNG images on an image-processing utility. The PNG standard specifies that all images must start with a standard 8-byte header PNG_H, thus simply by specifying a prefix precondition:

$$(input[0]=PNG\_H[0]) \wedge \ldots$$
$$\wedge (input[7]=PNG\_H[7]).$$

The preconditioned symbolic execution will only explore paths that satisfy the above predicate. Note that prefix preconditions need not only include exact equalities; they can also specify a range or an enumeration of values for the symbolic bytes, among other things.

Environment Modeling: Vulnerability Detection in the Real World

The system models much of the system environments that an attacker can possibly use as an input source. Therefore, the system May detect most security relevant bugs in real programs, and the support for environment modeling includes file systems, network sockets, standard input, program arguments, and environment variables. Additionally, the system handles most common system and library function calls. The system may employ modeling of all or some system call functions, such as open, read, and write. The system models may vary in the completeness for efficiency or other reasons. For example, the system may ignore symbolic file properties such as permissions, in order to avoid producing additional paths or constraints.

To be able to produce remote exploits, the system may provide network support in order to analyze networking code. A symbolic socket descriptor is handled similarly to a symbolic file descriptor, and symbolic network packets and their payloads are handled similarly to symbolic files and their contents. In some embodiments, the system handles all network-related functions, including socket, bind, accept, send, and so on.

Several vulnerabilities are triggered because of specific environment variables. Thus, the system may support modeling or functional summaries of environment variants, e.g., get_env.

In some embodiments, the system provides support for about 70 system calls. The system supports all the basic network system calls, thread-related system calls, such as fork, and also all common formatting functions, including printf and syslog. Threads are handled in the standard way, i.e., we spawn a new symbolic interpreter for each process/thread creation function invocation. In addition, the system reports a possibly exploitable bug whenever a (fully or partially) symbolic argument is passed to a formatting function. For instance, the system will detect a format string vulnerability for "fprintf(stdout, user_input)".

Referring back to FIG. 4, three components of the system (DBA, EXPLOIT-GEN and VERIFY) work together to convert an unsafe predicate ($\Pi_{bug}$) output by BUG-FIND into a working exploit $\epsilon$.

The binary analysis component 440 performs dynamic binary analysis on the target binary $B_{gcc}$ 407 with a concrete buggy input and extracts runtime information R. The concrete input is generated by solving the path constraints $\Pi_{bug}$. While executing the vulnerable function (specified in v at the source-code level), the binary component 440 examines the binary to extract low-level runtime information (R), such as the vulnerable buffer's address on the stack, the address of the vulnerable function's return address, and/or the stack memory contents just before the vulnerability is triggered. The binary component 440 ensures that data gathered during this stage are accurate, because the system relies on them to generate working exploits, which is discussed herein.

DBA is a dynamic binary analysis (instrumentation) step. It takes in three inputs: 1) the target executable ($B_{gcc}$) to be exploited; 2) the path constraints that lead up to the bug ($\Pi_{bug}$); and 3) the names of vulnerable functions and buffers, such as the buffer susceptible to overflow in a stack overflow attack or the buffer that holds the malicious format string in a format string attack. It then outputs a set of runtime information: 1) the address to overwrite (such as the address of the return address of a function, function pointers or entries in the GOT), 2) the starting address the system will write to, and 3) the additional constraints that describe the stack memory contents just before the bug is triggered. Once the system finds a bug, it replays the same buggy execution path using a concrete input. The concrete input is generated by solving the path constraints $\Pi_{bug}$. During DBA, the system performs instrumentation on the given executable binary $B_{gcc}$. When it detects the vulnerable function call, it stops execution and examines the stack. In particular, the system obtains the address of the return address of the vulnerable function (&retaddr), the address of the vulnerable buffer where the overwrite starts (bufaddr) and the stack memory contents between them (μ).

In the case of format string vulnerabilities, the vulnerable function is a variadic formatting function that takes user input as the format argument. Thus, the address of the return address (&retaddr) becomes the return address of the vulnerable formatting function. For example, if there is a vulnerable printf function in a program, the system overwrites the return address of the printf function itself, exploiting the format string vulnerability. This way, an attacker can hijack control of the program right after the vulnerable function returns. It is straightforward to adapt additional format string attacks such as GOT hijacking, using the system.

The system may examine additional state such as the stack contents during DBA in order to generate an exploit predicate ($\Pi_{bug} \wedge \Pi_{eploit}$). For example, if there is a dereference from the stack before the vulnerable function returns, simply overwriting the stack will not always produce a valid exploit.

Referring back to FIG. 4, the exploit generation component 450 receives a tuple with the path predicate of the bug ($\Pi_{bug}$) and runtime information (R), and constructs a formula for a control flow hijack exploit. The output formula includes constraints ensuring that: 1) a possible program counter points to a user-determined location, and 2) the location contains shell code (specifying the attacker's logic $\Pi_{exploit}$). The resulting exploit formula is the conjunction of the two predicates, which is discussed herein.

EXPLOIT-GEN takes in two inputs to produce an exploit: the unsafe program state containing the path constraints ($\Pi_{bug}$) and low-level runtime information R, i.e., the vulnerable buffer's address (bufaddr), the address of the vulnerable function's return address (&retaddr), and the runtime stack memory contents (μ). Using that information, EXPLOIT-GEN generates exploit formulas ($\Pi_{bug} \wedge \Pi_{exploit}$) for four types of exploits: 1) stack-overflow return-to-stack, 2) stack-overflow return-to-libc, 3) format-string return-to-stack, 4) format-string return-to-libc. The following is an example algorithm for generating an exploit formula for stack-overflow return-to-stack:

```
Input: (bufaddr, &retaddr, μ) = R
Output: Π_exploit
for i=1 to len(μ) do
    exp_str[i] ← μ[i];
offset ← &retaddr – bufaddr;
jmp_target ← offset + 8;
```

In order to generate exploits, the system may perform the following actions. First, the system determines the class of attack to perform and formulates $\Pi_{exploit}$ for control hijack. For example, in a stack-overflow return-to-stack attack, $\Pi_{exploit}$ should have the constraint that the address of the return address (&retaddr) should be overwritten to contain the address of the shell code—as provided by DBA in the case of AEG. Further, the exploit predicate $\Pi_{exploit}$ should also contain constraints that shell code should be written on the target buffer. The generated predicate is used in conjunction with $\Pi_{bug}$ to produce the final constraints (the exploit formula $\Pi_{bug} \wedge \Pi_{exploit}$) that can be solved to produce an exploit. The example algorithm shows how the exploit predicate ($\pi_{exploit}$) is generated for stack-overflow return-to-stack attacks.

In some cases, the system produces two types of exploits: return-to-stack and return-to-libc, both of which are popular classic control hijack attack techniques. The return-to-libc attack is different from the classic one in that we do not need to know the address of a "/bin/sh" string in the binary. This technique may allow bypassing defenses, such as stack randomization.

The return-to-stack exploit overwrites the return address of a function so that the program counter points back to the injected input, e.g., user-provided shellcode. To generate the exploit, the system finds the address of the vulnerable buffer (bufaddr) into which an input string can be copied, and the address where the return address of a vulnerable function is located. Using the two addresses, the system calculates the jump target address where the shellcode is located. The example algorithm describes how to generate an exploit predicate for a stack overflow vulnerability in the case of a return-to-stack exploit where the shellcode is placed after the return address.

In a classic return-to-libc attack, an attacker usually changes the return address to point to the execve function in libc. However, to spawn a shell, the attacker must know the address of a "/bin/sh" string in the binary, which may not be available. In some embodiments, the system creates a symbolic link to /bin/sh and uses for the link name an arbitrary string which resides in libc. For example, a 5 byte string pattern e8..0. . . .$_{16}$ is very common in libc, because it represents a call instruction on x86. Thus, the system finds a certain string pattern in libc, and generates a symbolic link to /bin/sh in the same directory as the target program. The address of the string is passed as the first argument of execve (the file to execute), and the address of a null string $00000000_{16}$ is used for the second and third arguments. The attack is valid only for local attack scenarios, but is more reliable since it may allow bypassing defenses such as stack address randomization.

Note that the above exploitation techniques (return-to-stack and return-to-libc) determine how to spawn a shell for a control hijack attack, but not how to hijack the control flow. Thus, the above techniques can be applied by different types of control hijack attacks, e.g., format string attacks and stack overflows. For instance, a format string attack can use either of the above techniques to spawn a shell. That is, the system is capable of handling all possible combinations of the above attack-exploit patterns.

The return-to-stack exploit may require shellcode to be injected on the stack. To support different types of exploits, the system may include a shellcode database with two shellcode classes: standard shell codes for local exploits, and binding and reverse binding shellcodes for remote exploits. In addition, this attack restores the stack contents by using the runtime information μ.

In some embodiments, the system supports at least four types of exploits: stack-overflow return-to-stack, stack-overflow return-to-libc, format-string return-to-stack, and format-string return-to-libc exploit, among others. The algorithms to generate the exp_str for each of the above exploits are simple extensions of the example algorithm. Note that the above list is explemplary in nature; other types of exploits may not require all the above steps, or may rearrange steps. For example, an embodiment generating information leak exploits may not need to include shellcode. One skilled at the art will realize that many different logical conditions can be used as the exploit predicate, such as creating information leak or disclosure exploit, an integer overflow exploit, a heap overflow exploit, a function pointer overwrite exploit, or a denial of service exploit.

In code-injection attack scenarios, the system may consider: 1) the format, e.g., size and allowed characters and 2) the positioning of the injected shellcode. Both are should be considered because advanced attacks have complex requirements on the injected payload, e.g., that the exploit string fits within a limited number of bytes or that it only contains alphanumeric characters. To find positioning, the system may apply a brute-force approach where it tries every possible user-controlled memory location to place the shellcode. For example, the system can place the shellcode either below or above the overwritten return address. To address the special formatting challenge, the system may have a shellcode database containing about many different shellcodes, including standard and alphanumeric. Again, the system may try all possible shellcodes in order to increase reliability.

Exploits are often delicate, especially those that perform control flow hijacking. Even a small change, e.g., the way a program executes either via ./a.out or via ../../../a.out, will result in a different memory layout of the process. This problem persists even when ASLR is turned off. Thus, the system may employ techniques to generate reliable exploits for a given system configuration: a) offsetting the difference in environment variables, and b) using NOP-sleds.

Environment variables are different for different terminals, program arguments of different length, etc. When a program is first loaded, environment variables will be copied onto the program's stack. Since the stack grows towards lower memory addresses, the more environment variables there are, the lower the addresses of the actual program data on the stack are going to be. Environment variables such as OLDPWD and (underscore) change even across same system, since the way the program is invoked matters. Furthermore, the arguments (argv) are also copied onto the stack. Thus, the length of the command line arguments affects the memory layout. Thus, the system may calculate the addresses of local variables on the stack based upon the difference in the size of the environment variables between the binary analysis and the normal run. This technique may be used when the system crafts the exploit on a machine and executes the exploit on another machine, among other reasons.

The system optionally uses NOP-sleds. In general, a large NOP-sled can make an exploit more reliable, especially against ASLR protection. On the other hand, the NOP-sled increases the size of the payload, potentially making the exploit more difficult or impossible. The NOP-sled option can be either turned on or off by a command line option.

Referring back to FIG. 4, the verification component 460 takes in the target binary executable $B_{gcc}$ 407 and an exploit formula $\Pi_{bug} \wedge \Pi_{exploit}$, and returns an exploit ϵ only if there is a satisfying answer. Otherwise, it returns ⊥. In some cases, the system performs an additional verification step, and runs the binary $B_{gcc}$ with ϵ as an input, and checks if the adversarial goal is satisfied or not, i.e., if the program spawns a shell, which is discussed herein.

VERIFY verifies the system outputs a working exploit. In some embodiments, it takes in two inputs: 1) the exploit constraints $\Pi_{bug} \wedge \Pi_{exploit}$, and 2) the target binary. It outputs either a concrete working exploit, e.g., an exploit that spawns a shell, or ⊥, if we fail to generate the exploit. VERIFY first solves the exploit constraints to get a concrete exploit. If the exploit is a local attack, it runs the executable with the exploit as the input and checks if a shell has been spawned. If the exploit is a remote attack, the system spawns three processes. The first process runs the executable. The second process runs nc to send the exploit to the executable. The third process checks that a remote shell has been spawned at port 31337.

In some embodiments, VERIFY runs the program under a debugging or analysis environment with the candidate exploit to verify it works.

In some embodiments, the system may utilize the following algorithm when automatically generating exploits:

```
Input: src: the program's source code
Output: {∈, ⊥}: a working exploit or ⊥
(B_gcc, B_llvm) = Pre-Process(src);
max = Src-Analysis(B_llvm);
while (Π_bug, V) = Bug-Find(B_llvm, φ, max) do
    R = DBA (B_gcc, (Π_bug, V));
int process_input(char input[42])
    char buf[20];
    while(input[i] != '\0')
        buf[i++] = input[i];
```

In some implementations, the system may be implemented and/or written in a mixture of C++ and Python, and includes 4 major components: symbolic executor (BUG-FIND), dynamic binary evaluator (DBA), exploit generator (EXPLOIT-GEN), and constraint solver (VERIFY). In some cases, KLEE acts as a backend symbolic executor, and added about 5000 lines of code to implement our techniques and heuristics as well as to add in support for other input sources (such as sockets and symbolic environment variables). The dynamic binary evaluator was written in Python, using a wrapper for the GNU debugger, with STP being used for constraint solving.

The following is an example of how the system generates an exploit, using a target application of the setuid root iwconfig utility from the Wireless Tools package (version 26), a program consisting of about 3400 lines of C source code. Here is a snippet of the source code for the utility:

```
int main(int argc, char **argv) {
int skfd;         /* generic raw socket desc. */
if(argc == 2)
        print_info(skfd, argv[1], NULL, 0);
...
static int print_info(int skfd, char *ifname, char *args[ ], int count) {
    struct wireless_info info;
    int     rc;
    rc = get_info(skfd, ifname, &info);
...
static int get_info(int skfd, char *ifname, struct wireless_info * info) {
    struct iwreq    wrq;
    if(iw_get_ext(skfd, ifname, SIOCGIWNAME, &wrq) < 0) {
        struct ifreq ifr;
        strcpy(ifr.ifr_name, ifname); /* buffer overflow */
```

The iwconfig has a classic strcpy buffer overflow vulnerability in the get_info function (line 15), which the system may spot and exploit automatically and very quickly as it performs the following steps using the components of FIGS. 2 and/or 4.

First, the system searches for bugs at the source code level by exploring execution paths. Specifically, the system executes iwconfig using symbolic arguments (argv) as the input sources. The system considers a variety of input sources, such as files, arguments, etc., by default. After following the path main→print_info→get_info, AEG reaches line 15, where it detects an out-of-bounds memory error on variable ifr.ifr_name. The system solves the current path constraints and generates a concrete input that will trigger the detected bug, e.g., the first argument has to be over 32 bytes. The system performs dynamic analysis on the iwconfig binary using the concrete input generated previously. It extracts runtime information about the memory layout, such as the address of the overflowed buffer (ifr.ifr_name) and the address of the return address of the vulnerable function (get_info). The system generates the constraints describing the exploit using the runtime information generated from the previous step: 1) the vulnerable buffer (ifr.ifr_name) must contain our shellcode, and 2) the overwritten return address must contain the address of the shellcode—available from runtime. Next, the system appends the generated constraints to the path constraints and queries a constraint solver for a satisfying answer. The satisfying answer gives the exploit string, which is shown as follows:

```
00000000 02 01 01 01 01 01 01 01 01 01 01 01 01 01
         01|................|
00000010 01 01 01 01 01 01 01 01 01 01 01 01 01 01
         01|................|
00000020 01 01 01 01 01 01 01 01 01 01 01 01 01 01
         01|................|
00000030 01 01 01 01 01 01 01 01 01 01 01 01 01 01
         01|................|
00000040 01 01 01 01 70 f3 ff bf 31 c0 50 68 2f 2f 73
         68|....p...1.Ph//sh|
00000050 68 2f 62 69 6e 89 e3 50 53 89 e1 31 d2 b0 0b cd
         |h/bin..PS..1....|
00000060 80 01 01 01 00
```

Finally, the system runs the program with the generated exploit and verifies that it works, i.e., spawns a shell. If the constraints were not solvable, the system would resume searching the program for the next potential vulnerability.

Thus, the system, using the components and techniques described herein, searched for and identified an exploitable bug within the utility, and automatically generated an exploit for the bug. As described herein, in some implementations, it may be desirable to generate exploits without relying on the source code of a software application.

Analyzing Binary Code in order to Automatically Generate Exploits

In some implementations, the system automatically finds exploitable bugs in binary (i.e., executable) programs and generates a working exploit for every found exploitable bug, which enables bug reporting to be actionable and security-critical. Thus, by using techniques that analyze the binary code of a software application, the system may check common off the shelf (COTS) software, which enables professionals without access to the source code to check the security of their software. Additionally, the system may achieve a high or otherwise suitable paths-per second rate for binary-only symbolic execution, and may produce test cases for code coverage, such as test cases that may be used in problem domains where source code is otherwise not available.

Figure 5:
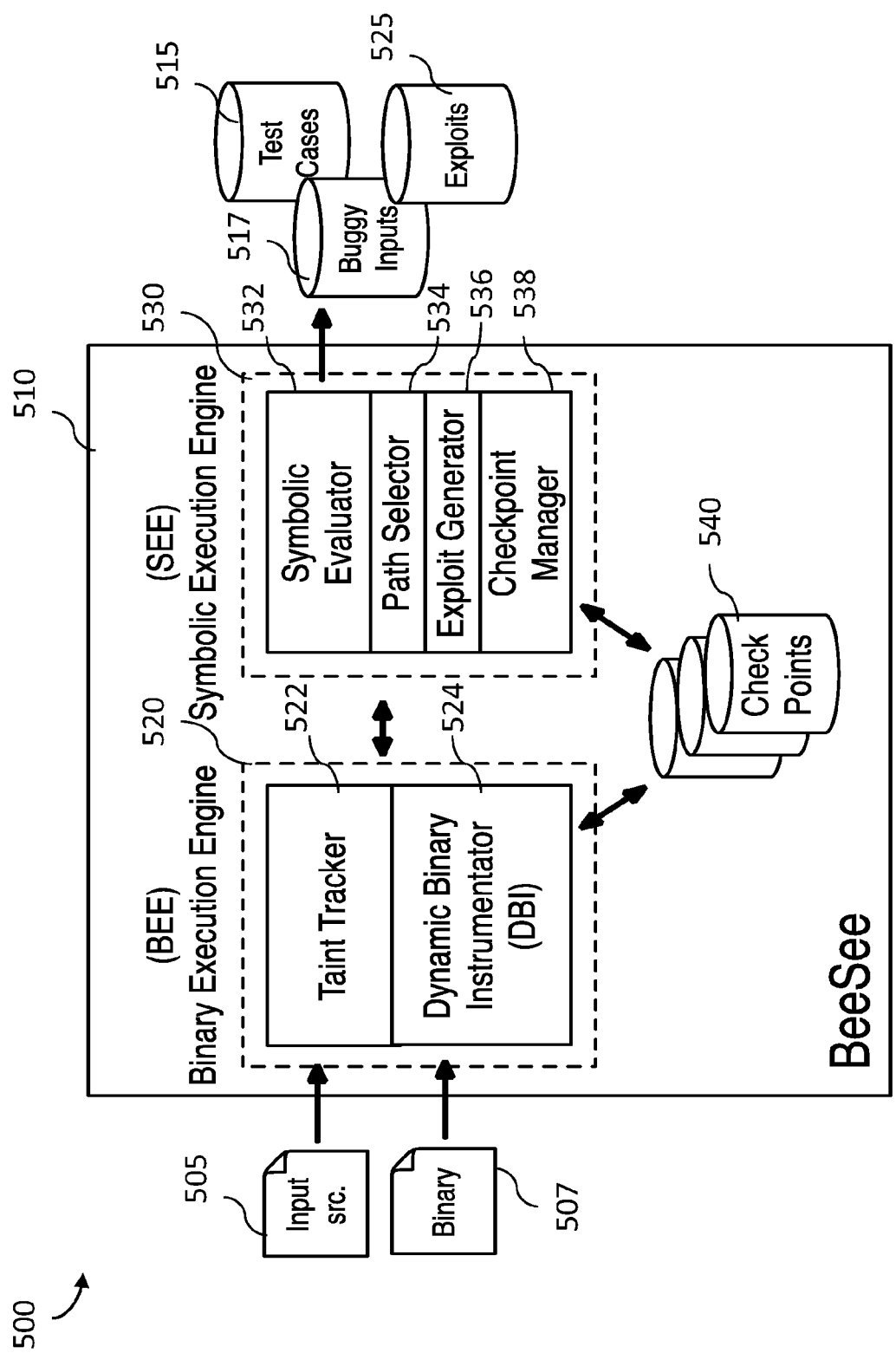
FIG. 5 is a block diagram illustrating components of an example automatic exploit generation module that generates exploits for a binary program.

FIG. 5 is a block diagram 500 illustrating components of an example automatic exploit generation module 510 that generates exploits for a binary program. The automatic exploit generation module 510 may include two components each performing various techniques, a binary execution engine (BEE) 520, which executes code natively on a CPU and includes a taint tracker 522 and a DBI 524, and a symbolic execution engine (SEE) 530, which includes a symbolic extractor 532, a path selector 534, an exploit generator 536, and a checkpoint manager 538. The components of the module 510 perform actions in response to an input source code 505 and/or an input binary 507, in order to generate exploits 525 for vulnerabilities in the code, as well as other products, such as test cases 515 and/or buggy inputs 517.

Let's use the following program, orzHttpd, an HTTP server, as an example source code 505 input into the system, in order to illustrate how the components of the module 510 function in generating an exploit (the source code is shown for clarity, although the module 510 works with binary code):

```
1 #define BUFSIZE 4096
2
3 typedef struct {
4       char buf[BUFSIZE];
5       int used;
6 } STATIC_BUFFER_t;
7
```

-continued

```
 8 typedef struct conn {
 9      STATIC_BUFFER_t read_buf;
10      ... // omitted
11 } CONN_t;
12
13 static void serverlog(LOG_TYPE_t type, const char *format, ...)
14 {
15      ... // omitted
16      if (format != NULL) {
17          va_start(ap, format);
18          vsprintf(buf, format, ap);
19          va_end(ap);
20      }
21      fprintf(log, buf); // vulnerable point
22      fflush(log);
23 }
24
25 HTTP_STATE_t http_read_request(CONN_t *conn)
26 {
27      ... // omitted
28      while (conn->read_buf.used < BUFSIZE) {
29          if ((sz = static_buffer_read(conn, &conn->read_buf)) < 0) {
30              ...
31          conn->read_buf.used += sz;
32              if (memcmp(&conn->read_buf.buf[conn->read_buf.used] - 4,
33                  "\r\n\r\n", 4) == 0)
34              {
35                  break;
36              }
37      }
38      if (conn->read_buf.used >= BUFSIZE) {
39          conn->status.st = HTTP_STATUS_400;
40          return HTTP_STATE_ERROR;
41      }
42      ...
43      serverlog(ERROR_LOG, "%s\n", conn->read_buf.buf);
44      ...
45 }
```

In orzHttpd, each HTTP connection is passed to http_read_request. This routine in turn calls static_buffer_read as part of the loop on line 28 to get the user request string. The user input is placed into the 4096-byte buffer conn→read_buf.buf on line 29. Each read increments the variable conn→read_buf.used by the number of bytes read so far in order to prevent a buffer overflow. The read loop continues until \r\n\r\n is found, checked on line 32-33. If the user passes in more than 4096 bytes without an HTTP end-of-line, the read loop aborts and the server returns a 400 error status message on line 40. Each non-error request gets logged via the serverlog function.

The vulnerability itself is in serverlog, which calls fprintf with a user specified format string. Variatic functions such as fprintf use a format string specifier to determine how to walk the stack looking for arguments. An exploit for this vulnerability works by supplying format strings that cause fprintf to walk the stack to a return address or pointer to memory location to overwrite. The exploit then uses additional format specifiers to write to the desired location. The vulnerability highlights several key points for finding exploitable bugs.

First, the system may need to reason through the loop reading input, the error checks, up to the call to fprintf to run into an exploitable bug. Without careful management an engine can get bogged down with too many symbolic execution threads because of the huge number of possible execution paths. Also, symbolic execution may be slow compared to concrete execution, since the semantics of an instruction are simulated in software. In orzHttp there are millions of instructions executed setting up the basic server before an attacker could even connect to a socket. The system may run as much code as possible natively, not under the symbolic execution engine, for efficiency reasons. However, a challenge may be synchronizing the state from the partial concrete execution within the symbolic execution engine.

The automatic exploit generation module 510 begins when a user runs: mayhem-f400--symb-socket./orzhttpd-f./config.xml with all remaining steps performed automatically.

The --symb-socket argument tells the system to perform symbolic execution on data read in from a socket. Effectively, it specifies which input sources are potentially under control of an attacker. The system may handle attacker input from the environment, network sockets, and file descriptors. In the example, 400 bytes of symbolic input from the network are introduced.

Referring back to FIG. 5, the system executes the vulnerable program concretely on the CPU in the BEE 520. The BEE 520 may also instruments the code to perform taint propagation, via the taint tracker 522. Taint tracking may only include instructions executing on data from an original "taint source", instructions operating on data derived from a taint source. In any case, instructions are sent via a network socket to the SEE 530. The system performs symbolic execution via the symbolic evaluator 532 on only the instructions sent to it by the running SEE 530.

When the BEE 520 encounters a branch condition or jump target it would like to explore, the BEE 520 may first checkpoint 540 and suspend concrete execution. The BEE 520 may suspend and waits for the SEE 530 to determine which branches are feasible. The BEE 520 will receive from the SEE 530 which branch target to explore next when it resumes. In some example embodiments, the BEE may choose not to checkpoint or suspend and continue executing.

The symbolic execution engine 530, running in parallel with the BEE 520, receives a stream of instructions. The SEE 530 performs symbolic analysis of the instructions. In one embodiment, the SEE 530 jits the instructions to an intermediate language (IL), and symbolically executes the corresponding IL. If concrete values are needed, it talks to the BEE 520 to obtain the values, e.g., when an instruction operates on a symbolic operand and a concrete operand. The SEE 530 symbolic execution engine builds two types of formulas, path formulas and exploitability formulas.

The path formula reflects the constraints to reach a particular line of code. Each conditional jump adds a new constraint on input. For example, lines 32-33 create two new paths: one which is constrained so that the read input ends in an \r\n\r\n and line 35 is executed, and one where the input does not end in \r\n\r\n and line 28 will be executed.

The exploitability formula determines whether i) the attacker can gain control of the instruction pointer (IP) and ii) execute its own payload. The formula checks if the attacker can gain control by seeing if they can overwrite a jump target, such as a stored return address or a stored function pointer. If an exploitability formula is produced, the system queries an SMT solver to see if it is satisfiable. A satisfying input will be, by construction, an exploit. The system only reports a there is a satisfying answer. Assuming no exploit is found on a path, the SEE 530 checks with the SMT solver if a path formula is satifiable. Each satisfiable path formula corresponds to a feasible path that will be further explored. Unsatisfiable formulas correspond to infeasible paths, and no further exploration of the path will occur. The SEE 530 gives all feasible paths to the path selector 534.

The path selector 534 chooses which path to explore next. Upon picking a path, it resumes a checkpointed BEE and tells it which branch to take. The BEE 520 then resumes and continues execution down the selected path. Each of the steps are performed at each branch until an exploitable bug is found, the system hits a user-specified maximum runtime, and/or all paths are exhausted.

Figure 6:
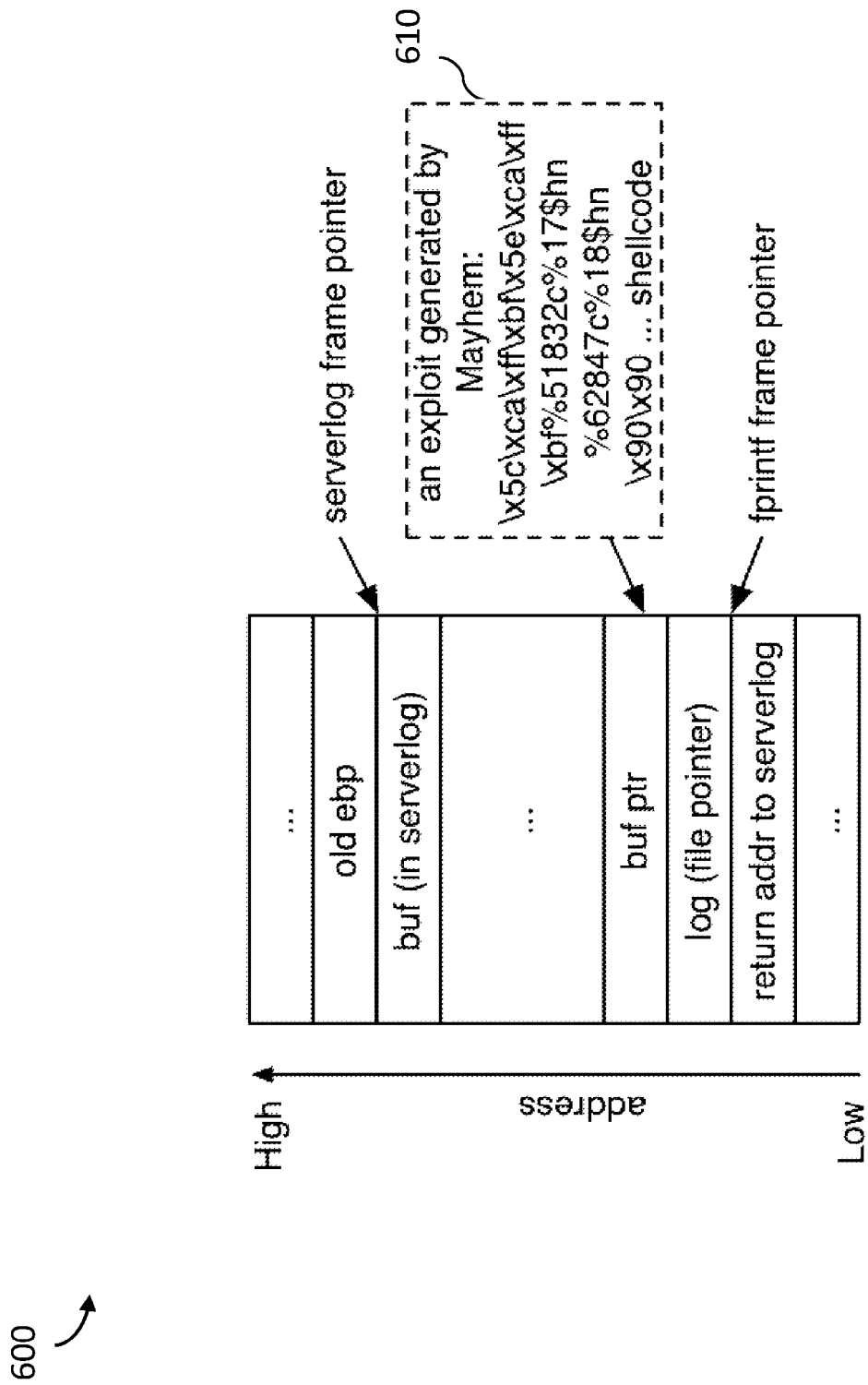
FIG. 6 is a block diagram illustrating an example stack layout having a vulnerability.

FIG. 6 shows in example embodiments the stack layout 600 of orzHttpd when the format string vulnerability is detected. There is a call to fprintf and the formatting argument is a string of user-controlled bytes. The system generates a custom exploitability formula to check whether the return address of fprintf is overwritable with the address of injected shellcode, and by solving this formula, produces a possible exploit 610.

Further example details regarding the automatic exploit generation module 510 configured to generate exploits from binary programs will now be discussed.

As described herein, symbolic execution may be performed on assembly instructions as they execute, or on an intermediate language. In the latter case, the symbolic executor may translate on-the-fly or ahead of time the instruction to our intermediate language IL, performs symbolic execution of the IL based upon syntax to produce a formula, tack on additional constraints related to specific attack payloads, and hands the formula to an SMT solver to check satisfiability.

In some embodiments, system jits x86 instruction to an IL in order to expose syntactically all side effects, including what processor flags are set or tested, and when. The example in our IL is:

1 addr 0x0 @asm "add eax,% ebx"
2 t:u32=R_EBX:u32
3 R_EBX:u32=R_EBX:u32+R_EAX:u32
4 R_CF:bool=R_EBX:u32<t:u32
5 addr 0x2 @asm "shl % cl,% ebx"
6 t1:u32=R_EBX:u32>>0x20:u32-(R_ECX:u32&0x1f: u32)
7 R_CF:bool=
8 (R_ECX:u32 & 0x1f:u32)=0:u32 & R_CT:bool|
9 ~((R_ECX:u32 & 0x1f:u32)=0:u32) & low:bool(t1:u32)
10 addr 0x4 @asm "jc 0x000000000000000a"
11 cjmp R_CF:bool, 0xa:u32, "nocjmp0" # branch to 0xa if R_CR=true
12 label nocjmp0

Unlike the raw assembly, this IL exposes the implicit semantics. Line 7-9 show exactly when the CF flag is set, here referenced by the IL variable R_CF of type bool.

In some embodiments, the IL is created to be a simplified representation of the executable program in order to simplify analysis. This approach has the advantage of separating the semantics of the assembly from the symbolic execution engine itself.

The IL may also include additional details to aid in reasoning about memory accesses. For example, multi-byte memory loads and stores may be simplified into single-byte reads and writes, because x86 is byte-addressable. For example, it is completely valid to store a 32-hit register to addresses a through a+3, and then subsequently load the middle two bytes as a 16-bit integer. Desugaring allows us to symbolically execute such code more accurately.

In concrete execution, the program is given a concrete value as input; it executes statements to produce new values, and terminates with final values. In symbolic execution we do not restrict execution to a single value, but instead provide a symbolic input variable that represents any possible input value. The symbolic execution engine is like an interpreter, where instead of producing a final concrete value for each statement it produces an expression in terms of the original symbolic inputs. When symbolic execution hits a branch, it can thus consider two possible worlds: one where the true branch target is followed and one where the false branch target is followed. It may choose one path or another, or both by conceptually forking off an interpreter for each branch and asserting in the generated formula that the branch guard must be satisfied. The final formula encapsulates all branch conditions that must be met to execute the given path, thus is called the path formula.

In the module 510, each IL statement type has a corresponding symbolic execution rule. (Note that other embodiments are possible, such as executing on the instructions instead of the IL, where rules are associated with instructions.) Assignment statements in the IL become equality constraints in the formula. Conditional jump statements create two formulas: one where the branch guard is asserted true and the true branch is followed, and one which asserts the negation of the guard and the false branch is followed. For example, if the module already has the formula f and execute cjmp $e_1, e_2, e_3$ where $e_1$ is the branch guard and $e_2$ and $e_3$ are jump targets, the module creates the two formulas:

$$f \wedge e_1 \wedge \text{FSE}(e_2)$$

$$f \wedge \neg e_1 \wedge \text{FSE}(e_3)$$

where FSE stands for forward symbolic execution of the jump target.

The symbolic execution engine produces a formula in logic. The overall technology may use a solver, such as an SMT solver implements, to determine whether each formula generated is satisfiable or not. If the formula is satisfiable, the system asks the solver for an assignment of values to variables that make the formula true. For example, given the formula $x=i+2 \land y=x*2 \land y<2^{32}$ the solver can return any value for $i$ such that $(i+2)*2<2^{32}$.

Additionally, an important point in practice is that there are generally many satisfying answers, which means the system can generate many syntactically different yet semantically equivalent exploits. Thus, the system enumerates exploits by enumerating satisfying answers. For example, the solver may return i=4 as the first satisfying answer to the above formula. On a subsequent query we find a different answer by tacking on i≠4 to the formula, and ask for satisfiability again. In this way we can check an exploit against arbitrary additional Boolean constraints.

While we normally think of the input to a program as being what a user supplies, from the program execution point of view any system call that returns a value provides input. The system may wish to consider only inputs from a particular input source or sources that potentially attacr control. For example, there may be no need to symbolically execute the webserver logic for reading configuration files in our running example since the configuration files are not under attacker control.

Most symbolic execution engines deal with the need to execute some values concretely and other symbolically by performing a mix of symbolic and concrete execution. The interesting design point is how to effectively coordinate concrete and symbolic together since a symbolic formula may refer to concretely executed values. One approach is to first concretely run the program on a seed input, record a trace, and then symbolically execute the trace values corresponding to symbolic inputs of interest. This approach is commonly referred to as concolic execution, for concrete and then symbolic execution. Concolic execution is generally an offline approach since the symbolic execution is performed offline.

A second approach is to perform purely online symbolic execution. In this approach each instruction is passed to the symbolic execution engine by default. The engine evaluates concrete values in software, using an interpreter. Whenever the interpreter reaches a symbolic branch, it forks two new interpreters—one for each realizable path. The advantage of this approach is that the symbolic execution engine can actively drive the interpreter down different code paths without re-starting the execution of the program, each executor continues from the instruction that forked, among other benefits. However, in some cases this approach may lead to high memory usage (because of the forked symbolic states.

The system may take a hybrid approach by concurrently executing the same program both concretely and symbolically in two processes. The two processes communicate using a light-weight RPC protocol. During execution, the BEE 520 communicates which instructions are derived from potential attacker inputs to the SEE 530. The SEE 530 only performs symbolic execution on those inputs. When the system reaches a symbolic branch, it generates an execution state for each feasible path—following the online approach. However, if the system has reached its resource cap, it will generate new input seeds—similar to the offline approach—instead of allocating new execution states.

This approach allows the BEE 520 to execute large portions of code natively on the CPU while retaining the ability to execute more paths without re-running the entire program as in purely offline concolic execution. The protocol also allows the BEE 520 and SEE 530 to be run on different cores or hosts. For example, in our experiments even when the BEE 520 is executing a Windows program the SEE 530 is running under Linux on a different host.

The SEE 530 manages the symbolic execution environment and decides which paths are executed by a BEE 520. The environment consists of a symbolic executor 532 thread for each path, a path selector 534, which determines which feasible path to run next in a BEE 520, and a checkpoint manager 538.

The SEE 530 caps the number of symbolic execution threads to run at any one time. When the cap is reached, the system stops generating new interpreters and produces seeds, new inputs that will explore program paths that the system was unable to explore in the first run due to the memory cap. Each one of those seeds is prioritized and used by the system to continue exploration of these paths at a subsequent run. Thus, when all pending execution paths terminate, the system selects a new seed and continues to run—until all seeds are consumed and the system exits.

Each symbolic execution thread maintains two contexts (as state): a variable context containing all symbolic register values and temporaries, and a memory context keeping track of all symbolic data in memory. Whenever execution forks, the SEE 530 clones the current symbolic state and adds a new symbolic executor in a priority queue. This priority queue is constantly updated by the path selector 534 to include all the latest changes (e.g., which paths were explored, instructions covered and so on).

Using symbolic expressions as an index whenever a value is read or written in memory is a common problem in symbolic execution. For instance, consider the following example:
1 index=get_input( )
2 target=load(jmp_table+index)
3 jmp target Since the index expression is symbolic, in the worst case the load expression might be accessing any possible value in memory. To deal with such cases most practical bug-finding tools consider two cases: a) check whether the index can point to particular memory cell or cells, or to unmapped memory and 2) select a value within memory and concretize the memory index to continue execution. However, the system does not need to necessarily select a single concrete index in memory. For instance, all C/C++ switch statements are compiled down to jump-tables and the index (the switch expression) is commonly user input—exactly as in the example shown above. Thus, simply concretizing the index can severely affect the code coverage of the system. To address this, the system may perform additional steps: a) first, using binary search it detects the upper and lower bounds of the symbolic index and b) for each one of the values that are feasible, the system forks a new interpreter with a different concretized index. To achieve a balance between good coverage and practicality, the system will enumerate indices only if the total range is less than a threshold (e.g., 500 in our experiments). Also, to avoid spawning too many interpreters exploring the same paths (e.g., when using a jump table with many identical targets), the system may keep only interpreters with distinct jump targets. If the range of the index is above the threshold, the system may select only some values and continues exploration.

As described herein, the system implements the ability to perform preconditioned symbolic execution. In preconditioned symbolic execution, the user specifies a partial specification of the format for inputs. The symbolic executor only explores paths which satisfy the precondition. The idea is the precondition check can weed out paths not of interest but would otherwise be explored.

In some embodiments, the system supports 3 types of preconditions: none, length, and crashing input. A length precondition asserts that the minimum string length of a symbolic input. This is implemented by ensuring all inputs characters less than minimum length n are not NULL. A crashing-input precondition and test nearby execution paths for exploitability. If a user does not provide a precondition, all paths are explored. This corresponds to the user providing the minimum amount of information to the system. The above are exemplary in nature. Other preconditions correspond to different assumptions or desires a user may have about what code paths are also possible.

The system may apply path prioritization heuristics to decide which feasible path should be explored by the next free symbolic interpretation thread, as well as executors internally during online symbolic execution. In on embodiment the system is based on three ranking heuristic rules: a) executors exploring new code have higher priority, b) executors that identify symbolic memory accesses have even higher priority, and c) execution paths where symbolic instruction pointers were detected have the maximum priority. Additional ranking heuristics are possible, such as prioritizing by whether the path is expected to more quickly reach a predetermined goal instruction, and so on.

The BEE 520 takes in the binary program, a list of input sources to be considered symbolic, and an optional checkpoint input that contains execution state information from a previous run. When no checkpoint is provided, the BEE 520 starts the concrete execution of the program from the beginning. The BEE 520 performs taint analysis. Every basic block that contains tainted instructions is sent to the SEE 530 for symbolic execution. As a response, the BEE 520 receives the address of the next basic block to be executed and whether to store the current memory state by taking a snapshot. Whenever an execution path is complete, BEE 520 restores the state of a previous snapshot and continues execution. BEE terminates only if all possible execution paths have been explored or a timeout was reached. If we provide a checkpoint, the BEE 520 executes the program concretely until the checkpoint and then continues execution as before.

For every symbolic conditional branch, symbolic execution may wish to reason about the feasibility of both program paths; for every memory access, the executor may need to detect which cells it may point to, including whether we can access unmapped memory; and last, for every completed path it may need to output an input that will exercise the same path. All these tasks rely on the solver, thus making it a potential bottleneck. In one embodiment, the system may employ several formula simplification and optimization techniques to speed-up solver queries in practice. In the following paragraphs we present examples. Other optimizations or simplifications are possible.

Traditional symbolic execution creates a single monolithic formula, which is passed to the SMT solver. The system partitions these monolithic formulas into several smaller formulas using slicing techniques. The result is the SMT solver ends up running faster because it reasons about smaller formulas. Specifically, in the system, every formula is a map from sets of variables to boolean predicates of these variables. All the variable sets in the map are disjoint. Whenever we need to test the satisfiability of a symbolic expression e that has a symbolic variable, the system considers the formula associated with the set containing variable $\{vars_i\} \rightarrow f(vars_i)$. Further, when the system needs to generate a satisfying assignment for all variables in the formula, it iterates over all variable sets in the map and gathers the results from each smaller formula.

The system simplifies symbolic expressions and formulas by applying an extensive list of algebraic simplifications, e.g. $x \oplus x = 0$, $x \& 0 = 0$ and so on. Similar to a compiler, all these simplifications are applied in a syntax-directed fashion. There is no easy way of expressing a syntax-directed rule to simplify the above expression—provided that we want to keep a small and generally applicable ruleset. One suitable heuristic is to rearrange terms of an expression (such as "pushing" constants within symbolic expressions) to trigger more simplifications. To address such problems, the system attempts to perform such expression rearranging speculatively, and the changes are preserved only if more simplifications were triggered.

In some cases, the system also performs implied value concretization. Certain path constraints may concretize (make constant) a symbolic variable. For example, adding a path condition of the form (symb_char−0x0d=0) to our path predicate, effectively turns symb_char into a constant (0x0d). Thus, whenever such restrictive equality constraints are added to the path predicate, the system solves them and performs constant folding on the path predicate. Subsequent computations that involve this specific symbolic variable will immediately use the concretized value.

The system may check for exploits by determining if the instruction pointer contains a value influenced or pre-determined by attacker input. Two instances of such as policy are buffer overflow and format string attacks. The system can generate exploits for any possible instruction-pointer overwrite by a variety of tests. On test is to check whether the system can set the instruction pointer to point to a position in memory we can place shellcode (is symbolic). If the test succeeds, the system outputs a satisfying assignment to input variables as an exploit and mark the bug found as exploitable. If the test fails, the system performs a second test to check whether it can set the instruction pointer to point to libc or the code section of the program. If the test for libc succeeds, the system outputs a return-to-libc attack—for the code section we output "possibly exploitable bug" since it can use return-oriented programming tools. If this check also fails and eip is really a constant (e.g., due to a previous concretization), the system will generate a buggy input and a new seed to check whether eip could be overwritten with a different value. To produce the new seed, the system uses solely the path predicate Π provide another value to the instruction pointer.

To identify and generate format string attacks, the system may include an extra safety predicate that checks whether the format argument of certain functions (e.g., printf, fprintf, vfprintf, syslog etc.) does not contain any symbolic bytes. If any symbolic bytes are detected, it tries to place a format string payload within the argument that will overwrite the return address of the formatting function.

The system is able to generate both local and remote attacks. In some cases, the system handles both types of attacks similarly. For example, for Windows, the system detects the overwriting of SEH structure on stack, and first tries to create a SEH-based exploit before trying buffer overflow attacks.

The system may also include other types of exploits to attempt. For example, in some embodiments the system may also generate exploits that leak sensitive data may be leaked to an attacker. For example, the predicate used during symbolic execution captures the logical conditions necessary to leak the sensitive information. Other example exploits include denial of service, integer overflow, heap overflow, and so on.

In some implementations, the system includes about 12,000 lines of C/C++ and OCaml code, with the binary instrumentation framework being built atop of PIN and all the hooks for modeled system and API calls written in C/C++. The SEE symbolic executor is written in OCaml and includes about 3,000 lines of code. Z3 is used as a decision procedure, for which we built direct OCaml bindings. To allow for remote communication between the two components, a cross-platform, light-weight RPC protocol (both in C++ and OCaml) was implemented.

Implementing the Automatic Exploit Generation Techniques

At its core, a challenge of automatic exploit generation is finding program inputs that result in a desired exploited execution state. However, the techniques provided by the system may scale to very large programs, enabling formal verification techniques to produce exploits, and allowing implementations to directly benefit from advances in formal verification, among other benefits.

In some implementations, the system generates a control flow hijack exploit input that intuitively accomplishes two things. First, the exploit should violate program safety, e.g., cause the program to write to out-of-bound memory. Second, the exploit should redirect control flow to the attacker's logic, e.g., by executing injected shellcode, performing a return-to-libc attack, and so on. The system may utilize program verification techniques to verify that the program is exploitable (as opposed to traditional verification that verifies the program is safe).

The exploited state is characterized by two Boolean predicates: a buggy execution path predicate $\Pi_{bug}$, and a control flow hijack exploit predicate $\Pi_{exploit}$, specifying the control hijack and the code injection attack. The $\Pi_{bug}$ predicate is satisfied when a program violates the semantics of program safety. However, simply violating safety is typically not enough. The $\Pi_{exploit}$ captures the conditions needed to hijack control of the program.

Thus, in some cases, an successfully generated exploit by the system is any input $\epsilon$ that satisfies the Boolean equation:

$$\Pi_{bug}(\epsilon) \wedge \Pi_{exploit}(\epsilon) = \text{true} \quad (1)$$

Based on this formula, the system, in some implementations, may operate to check at each step of the execution whether Equation 1 is satisfiable, with satisfying answer is, by construction, a control flow hijack exploit. Further details regarding these predicates now follow.

The Unsafe Path Predicate $\Pi_{bug}$ represents the path predicate of an execution that violates the safety property $\phi$. In some implementations, the system may use well-known safety properties for C programs, such as checking for out-of-bounds writes, unsafe format strings, and so on. The unsafe path predicate $\Pi_{bug}$ partitions the input space into inputs that satisfy the predicate (unsafe), and inputs that do not (safe). While path predicates are sufficient to describe bugs at the source-code level, in the system they are necessary but insufficient to describe the very specific actions we wish to take, e.g., execute shellcode.

The Exploit Predicate $\Pi_{exploit}$ specifies the attacker's logic that the attacker wants to do after hijacking eip. For example, if the attacker only wants to crash the program, the predicate can be as simple as "set eip to an invalid address after we gain control". Generally, the attacker's goal is to get a shell. Therefore, $\Pi_{exploit}$ may specify that the shellcode is well-formed in memory, and that eip will transfer control to the shellcode. The conjunction of the exploit predicate ($\Pi_{exploit}$) will induce constraints on the final solution. If the final constraints (from Equation 1) are not met, we consider the bug as non-exploitable.

The formula enables the system to use formal verification techniques to generate exploits. The system scales by restricting the state space to only include states that are likely exploitable, e.g., by considering only inputs of a minimum length needed to overwrite any buffer. We achieve this by performing low-cost analysis to determine the minimum length ahead of time, which allows us to prune off the state space search during the (more expensive) verification step.

Therefore, the system, in some implementations, utilizes preconditioned symbolic execution as a verification technique for pruning off portions of the state space that are uninteresting. Preconditioned symbolic execution is similar to forward symbolic execution in that it incrementally explores the state space to find bugs. However, preconditioned symbolic execution takes in an additional $\Pi_{prec}$ parameter. Preconditioned symbolic execution only descends into program branches that satisfy $\Pi_{prec}$, with the net effect that subsequent steps of unsatisfied branches are pruned away. The system utilizes preconditioned symbolic execution to restrict exploration to only likely-exploitable regions of the state space. For example, for buffer overflows, $\Pi_{prec}$ is specified via lightweight program analysis that determines the minimum sized input to overflow any buffer.

Logically, the system may find one, many, or all possible exploits when $\Pi_{prec}$ is less restrictive than the exploitability condition:

$$\Pi_{bug}(x) \wedge \Pi_{exploit}(x) \Rightarrow \Pi_{prec}(x) \quad (2)$$

In practice, this restriction can be eased to narrow the search space even further, at the expense of possibly missing some exploits.

The system described herein provides various benefits for computer security applications. Practical automatic exploit generation may fundamentally change the perceived capabilities of attackers. Understanding the capabilities of attackers informs what defenses are appropriate. Practical automatic exploit generation may also apply to defense. For example, automated signature generation algorithms take as input a set of exploits, and output an IDS signature (such as an input filter) that recognizes subsequent exploits and exploit variants. Automatic exploit generation can be fed into signature generation algorithms by defenders without requiring real-life attacks, among other benefits.

At a high level, the techniques above are amenable to the extent the underlying vulnerability can be captured as a safety property.

CONCLUSION

As described herein, in some implementations, the system, running on a computing machine, searches for and identifies vulnerabilities within a software application and automatically generates exploits for the identified vulnerabilities that are exploitable.

Figure 7:
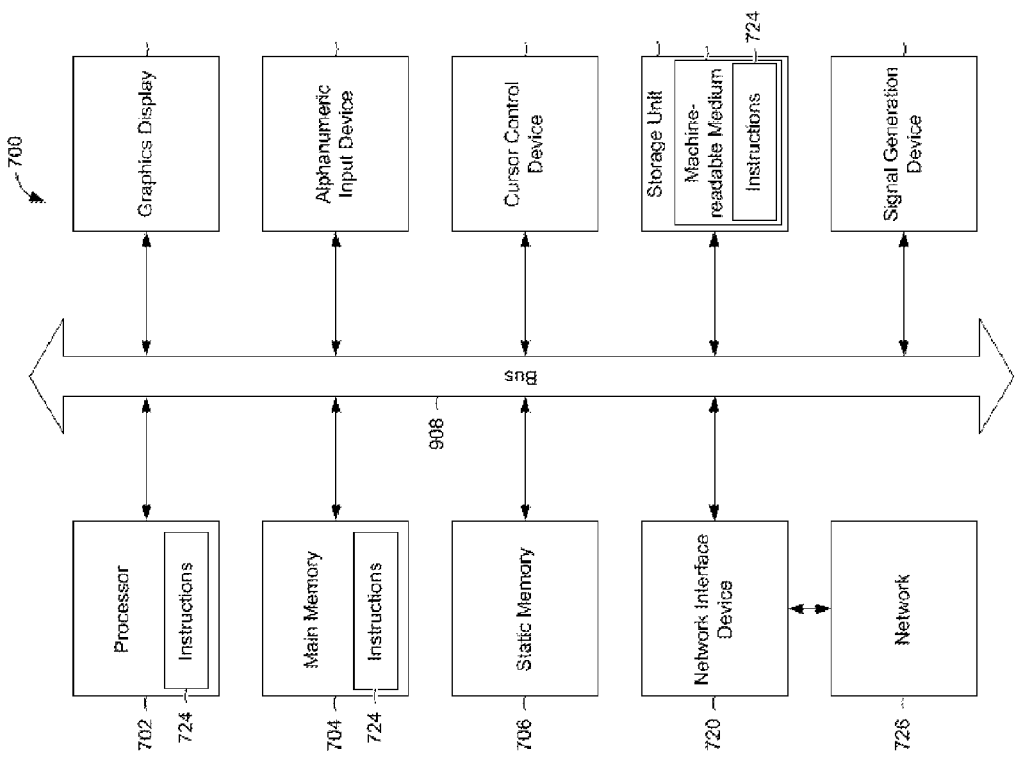
FIG. 7 is a block diagram illustrating components of a machine, according to example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and is static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   by one or more processors of a machine, accessing and analyzing code of a software application to identify a set of vulnerabilities of the software application, each vulnerability among the set of vulnerabilities corresponding to a different execution path among a set of execution paths to be explored within the code during the analyzing of the code;
   by one or more processors of the machine, determining that a vulnerability among the identified set of vulnerabilities of the software application is exploitable by:
      ranking the set of execution paths to be explored; and
      identifying within the analyzed code an execution path that leads to arbitrary code being enabled to execute on a computer during execution of the software application by the computer, the identifying being performed by exploring the execution path in accordance with the ranking of the set of execution paths; and
   by one or more processors of the machine, automatically generating an exploit for the determined exploitable vulnerability, the automatically generated exploit including an input that, after being inputted to the software application during execution of the software application by the computer, causes the software application to follow the execution path that leads to arbitrary code being enabled to execute on the computer.

2. The method of claim 1, wherein the analyzing of the code of the software application includes performing symbolic execution to determine at least a portion of the set of execution paths to be explored.

3. The method of claim 1, wherein the analyzing of the code of the software application includes performing heuristic search techniques to determine at least a portion of the set of execution paths to be explored.

4. The method of claim 1, wherein the analyzing of the code of the software application includes searching source code of the software application for potential vulnerabilities.

5. The method of claim 1, wherein the analyzing of the code of the software application includes searching executable code of the software application for potential vulnerabilities.

6. The method of claim 1, further comprising:
   generating exploits for multiple vulnerabilities among the identified set of vulnerabilities of the software application in accordance with the ranking of the set of execution paths.

7. The method of claim 1, wherein:
   the analyzing of the code of the software application includes performing path prioritization techniques.

8. The method of claim 1, wherein:
the ranking of the set of execution paths to be explored is based on a buggy-path-first prioritization technique.

9. The method of claim 1, wherein:
the ranking of the set of execution paths to be explored is based on a loop exhaustion prioritization technique.

10. A non-transitory computer-readable storage medium whose contents, when executed by one or more processors of a computing device, cause the computing device to perform operations comprising:
by the one or more processors, accessing and analyzing code of a software application to identify a set of bugs within the software application, each bug among the set of bugs corresponding to a different execution path among a set of execution paths to be explored within the code during the analyzing of the code;
by the one or more processors, identifying multiple bugs among the set of bugs within the software application as exploitable by:
ranking the set of execution paths to be explored; and
identifying within the analyzed code multiple execution paths that each lead to arbitrary code being enabled to execute on the computer during execution of the software application by the computer, the identifying being performed by exploring the multiple execution paths in accordance with the ranking of the set of execution paths;
by the one or more processors, prioritizing the identified exploitable multiple bugs based on corresponding levels of exploitability of the identified exploitable multiple bugs; and
by the one or more processors, generating exploits for the identified exploitable multiple bugs based on their corresponding levels of exploitability, each of the generated exploits including a different input that, after being inputted to the software application during execution of the software application by the computer, causes the software application to execute according to a different execution path that leads to arbitrary code being enabled to execute on the computer.

11. The computer-readable storage medium of claim 10, wherein the generating of the exploits for the identified exploitable multiple bugs includes, for each of the identified exploitable multiple bugs, constructing a formula for a control flow hijack exploit based on tuple information, path predicate information, and runtime information for the corresponding bug.

12. The computer-readable storage medium of claim 10, wherein the identifying of the multiple bugs among the set of bugs within the software application as exploitable includes performing a dynamic binary analysis on the set of bugs.

13. The computer-readable storage medium of claim 10, wherein the analyzing of the code of the software application includes performing path prioritization techniques.

14. The computer-readable storage medium of claim 10, wherein the ranking of the set of execution paths to be explored is based on a buggy-path-first prioritization technique.

15. The computer-readable storage medium of claim 10, wherein the ranking of the set of execution paths to be explored is based on a loop exhaustion prioritization technique.

16. A system comprising:
a binary execution engine comprising one or more hardware processors and configured to access and analyze code of a software application to identify a set of vulnerabilities of the software application, each vulnerability among the set of vulnerabilities corresponding to a different execution path among a set of execution paths to be explored within the code during the analyzing of the code, and
a symbolic execution engine comprising one or more processors and configured to: determine that a vulnerability among the identified set of vulnerabilities of the software application is exploitable by:
ranking the set of execution paths to be explored; and
identifying within the analyzed code an execution path that leads arbitrary code being enabled to execute on a computer during execution of the software application by the computer, the identifying being performed by exploring the execution path in accordance with the ranking of the set of execution paths; and
automatically generate an exploit for the determined exploitable vulnerability, the automatically generated exploit including an input that, after being inputted to the software application during execution of the software application by the computer, causes the software application to follow the execution path that leads to arbitrary code being enabled to execute on the computer.

17. The system of claim 16, wherein:
the binary execution engine includes:
a taint tracker module configured to perform taint propagation on the code of the software application; and
a dynamic binary analysis module configured to perform dynamic binary analysis on the code of the software application; and wherein
the symbolic execution engine includes:
a symbolic evaluation module configured to perform symbolic execution of the set of execution paths in accordance with the ranking of the set of execution paths;
a path selector module configured to perform the ranking of the set of execution paths to be explored;
an exploit generation module configured to automatically generate the exploit for the determined exploitable vulnerability; and
a checkpoint manager module configured to control concrete execution of the code of the software application by the binary execution engine.

18. The system of claim 16, wherein the binary execution engine includes:
a taint tracker module configured to perform taint propagation on the code of the software application; and
a dynamic binary analysis module configured to perform dynamic binary analysis on the code of the software application to detect exploitable function calls.

19. The system of claim 16, wherein the symbolic execution engine includes:
a symbolic evaluation module configured to perform symbolic execution of the set of execution paths in accordance with the ranking of the set of execution paths;
a path selector module configured to perform the ranking of the set of execution paths to be explored;
an exploit generation module configured to automatically generate the exploit for the determined exploitable vulnerability; and
a checkpoint manager module configured to control concrete execution of the code of the software application by the binary execution engine.

20. The system of claim 16, wherein the binary execution engine is configured to run executable code of the software application.

21. The system of claim 16, wherein the binary execution engine is configured to perform preconditioned symbolic execution to run a subset of the code of the software application to identify potential vulnerabilities within the software application.

22. The system of claim 16, the binary execution engine is configured to utilize an input prefix as a precondition for running a subset of the code of the software application to identify potential vulnerabilities within the software application.

23. The system of claim 16, the binary execution engine is configured to perform heuristic search techniques to run a subset of the code of the software application to identify potential vulnerabilities within the software application.

\* \* \* \* \*